(12) United States Patent
Wang et al.

(10) Patent No.: US 11,466,786 B2
(45) Date of Patent: Oct. 11, 2022

(54) VALVE FOR CONTROLLING A FLUID FLOW

(71) Applicant: Robert Bosch GmbH, Stuttgart (DE)

(72) Inventors: Haixiang Wang, Shanghai (CN); Thomas Demmer, Stuttgart (DE); Rob Hickey, Concord, NH (US); Thomas Helming, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 547 days.

(21) Appl. No.: 16/491,190

(22) PCT Filed: Feb. 28, 2018

(86) PCT No.: PCT/EP2018/054909
§ 371 (c)(1),
(2) Date: Sep. 5, 2019

(87) PCT Pub. No.: WO2018/162294
PCT Pub. Date: Sep. 13, 2018

(65) Prior Publication Data
US 2020/0033035 A1     Jan. 30, 2020

(30) Foreign Application Priority Data

| Mar. 7, 2017 | (DE) | 10 2017 203 719.9 |
| Mar. 8, 2017 | (DE) | 10 2017 203 759.8 |
| May 16, 2017 | (DE) | 10 2017 208 181.3 |

(51) Int. Cl.
*F16K 11/07*     (2006.01)
*F25B 5/02*      (2006.01)
(Continued)

(52) U.S. Cl.
CPC ........ *F16K 11/0743* (2013.01); *F16K 11/076* (2013.01); *F25B 41/35* (2021.01);
(Continued)

(58) Field of Classification Search
CPC ..... F16K 11/0743; F16K 11/076; F25B 41/35
See application file for complete search history.

(56) References Cited

U.S. PATENT DOCUMENTS

| 2,911,008 A | 11/1959 | Du Bois |
| 4,183,499 A | 1/1980 | Swartz et al. |

(Continued)

FOREIGN PATENT DOCUMENTS

| AT | 2806 | 4/1999 |
| CN | 1912506 A | 2/2007 |

(Continued)

OTHER PUBLICATIONS

International Search Report for Application No. PCT/EP2018/054909 dated May 11, 2018 (English Translation, 3 pages).

*Primary Examiner* — Kevin R Barss
(74) *Attorney, Agent, or Firm* — Michael Best & Friedrich LLP

(57) ABSTRACT

The invention relates to a valve (1, 1a), in particular an expansion valve, for controlling fluid flow, having a valve central housing (10, 10a) having a first and a second opening (12, 12a, 14, 14a) and a valve element (20, 20a) which has a rotationally symmetrical outline and is arranged rotatably within the valve element housing (10, 10a). According to the invention, the valve element (20, 20a) has a cut-out, wherein the cut-out (30, 30a, 30b, 30c) has a variable dimension, and a sub region (32, 32a) of the cutout (30, 30a, 30b, 30c) is formed continuously through the valve element (20, 20a).

23 Claims, 9 Drawing Sheets

Figure 1:
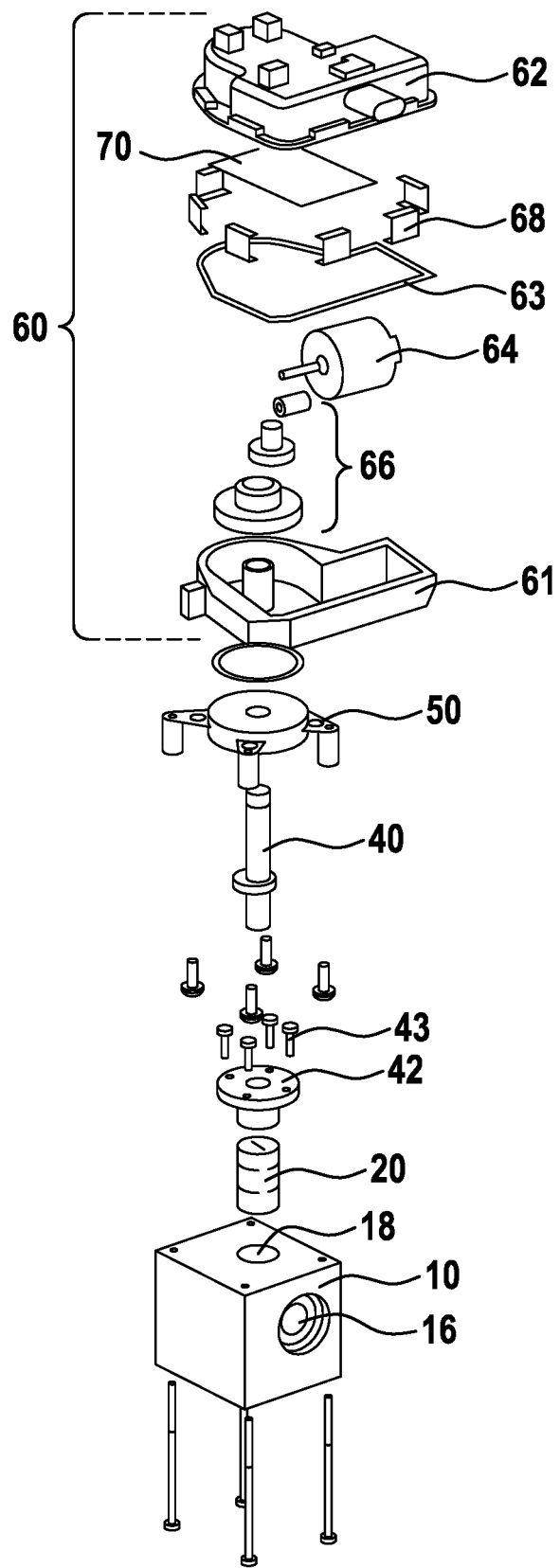

(51) Int. Cl.
    *F25B 41/385*       (2021.01)
    *F16K 11/074*       (2006.01)
    *F16K 11/076*       (2006.01)
    *F25B 41/35*         (2021.01)

(52) U.S. Cl.
    CPC ............... *F25B 5/02* (2013.01); *F25B 41/385* (2021.01); *F25B 2500/18* (2013.01)

(56) References Cited

U.S. PATENT DOCUMENTS

| | | | |
|---|---|---|---|
| 5,242,150 A | | 9/1993 | Shiffler et al. |
| 5,524,822 A | | 6/1996 | Simmons |
| 2007/0107787 A1 | | 5/2007 | Moretz |
| 2021/0262578 A1* | | 8/2021 | Lange .................... F16K 3/08 |

FOREIGN PATENT DOCUMENTS

| | | |
|---|---|---|
| CN | 103851209 A | 6/2014 |
| DE | 19703042 A1 | 10/1997 |
| EP | 1593891 | 11/2005 |
| EP | 2171372 | 4/2010 |
| EP | 3006794 | 4/2016 |
| FR | 1560469 A | 3/1969 |
| JP | 2000314575 | 11/2000 |
| JP | 2001343076 | 12/2001 |

\* cited by examiner

VALVE FOR CONTROLLING A FLUID FLOW

BACKGROUND OF THE INVENTION

The invention relates to a valve, in particular an expansion valve, for controlling a fluid stream, having a valve means housing, with a first opening and a second opening, and having a valve means which has a rotationally symmetrical basic shape and is arranged rotatably within the valve means housing.

Valves for regulating a fluid stream are already known. It is also known to use a corresponding number of valves for the regulation of more than one fluid stream.

SUMMARY OF THE INVENTION

It is advantageous that a valve according to the invention can set a fluid stream, in particular a refrigerant stream for two evaporators, in such a way that continuous operation with desired refrigerating capacities can be produced. Here, a valve position can be moved to, which valve position provides the desired homogeneous fluid streams at the same time for two evaporators. When a suitable valve position is set, the valve does not have to be moved as long as the refrigerating capacities at the evaporators do not change, as a result of which energy can be saved and the wear of the valve drive is reduced.

A valve according to the invention makes, in particular, the independent expansion regulation for two evaporators with only one drive possible, which saves costs, in particular. The form of the rotating valve means has to be designed in such a way that the opening cross sections at the outputs are superimposed as a function of the drive position in such a way that all desired combinations of refrigerant streams at the two outputs are made possible. Two fluid streams can be regulated by way of one valve according to the invention.

Advantageous developments and improvements of the features which are indicated in the main claim result from the measures which are stated in the subclaims.

It is advantageous that the valve means has a pot-shaped or sleeve-shaped basic shape. Furthermore, it is advantageous that the valve means has a disk-shaped basic shape. This is a valve means which can be produced simply.

It is particularly advantageous that the valve means of pot-shaped or sleeve-shaped configuration has a valve means shell, a valve means bottom and a valve means edge. The valve means edge points in the direction of a first opening. The first opening is preferably configured as an axial bore within the valve housing. The valve means shell has at least one recess. A fluid stream through the second opening, preferably through the first opening, an inner region of the valve means and the second opening can be regulated in a manner which is dependent on the position, in particular the rotary position, of the valve means, preferably the position of the recess, relative to a second opening. The valve means is preferably configured as a hollow cylinder. The regulation of the throughflow can be regulated in a manner which is dependent on the overlap of the second opening by way of the valve means.

It is to be considered advantageous that at least one of the recesses is configured on the upper side and/or underside, in particular of the disk-shaped valve means. It is advantageous that at least one recess is configured as a channel, in particular as a groove, in particular on the upper side and/or underside or in the outer circumference of the valve means. This results in an advantageous regulation of the throughflow cross section.

It is advantageous that the continuous region of a recess is configured as an (in particular, circular) hole, preferably as an aperture. This results in an optimum throughflow cross section which can be adapted, in particular, to the cross section of the openings.

It is particularly advantageous that the valve means housing has a third opening. A fluid stream through the third opening, preferably the first opening, an inner region of the valve means and the third opening can be regulated in a manner which is dependent on the position, in particular the rotary position, of the valve means, preferably of at least one recess of the valve means, relative to the third opening. Therefore, two separate fluid streams can be regulated with one valve. The regulation of the throughflow can be regulated in a manner which is dependent on the overlap of the third openings by way of the valve means.

It is advantageous that the valve means has one (in particular, more than two) second recess. As a result, the throughflow cross sections of the second and third openings can be regulated as desired in a manner which is dependent on the rotary position.

It is advantageous that at least one of the recesses has a varying dimension, in particular cross section, depth and/or width in the circumferential direction. Regulation of the throughflow cross section in a manner which is dependent on the rotary position of the valve means with respect to the valve housing and the openings is provided.

It is advantageous that the second opening and the third opening are configured in the valve means housing offset with respect to one another, as viewed in the longitudinal direction and/or circumferential direction of the valve. Regulation capability of the fluid streams is therefore provided.

It is particularly advantageous that an actuator is provided for rotating the valve means, in particular as a stepping motor, a brush motor or a brushless motor. Precise setting of the rotary position of the valve means is provided.

It is advantageous that the valve means housing has a throughflow region. The throughflow region is configured as a recess. The valve means is arranged (in particular, rotatably) in the throughflow region.

It is to be considered advantageous that a flange is provided which is connected fixedly to the valve means housing. The flange holds the valve means in position. The flange seals the throughflow region, in which the valve means is arranged, with respect to the surroundings.

It is advantageous that the recess and/or the recesses is/are configured in such a way that, plotted against the rotary angle, a first fluid stream from one of the openings rises as far as a maximum and is then interrupted, whereas, plotted against the (in particular, identical) rotary angle, a second fluid stream from a further opening rises multiple times, in particular rises as far as a maximum, and is subsequently interrupted. This results in a simple regulation capability of two fluid streams.

It is particularly advantageous that, plotted against the rotary angle, the second fluid stream is of sawtooth-like configuration, pauses being configured, in particular, between the sawteeth, in which pauses the fluid stream through an opening is interrupted.

It is advantageous that the valve has a pressure sensor. The pressure sensor is integrated into the valve means housing. The pressure sensor detects the (low) pressure of the fluid in one of the openings, in particular the second or third opening. The pressure sensor outputs a pressure signal which is processed in the electronics of the valve. In a manner which is dependent on the detected pressure, the rotary position of the valve means is regulated in such a way that no overheating occurs in one or both of the downstream evaporators. The throughflow is regulated in a pressure-dependent manner. No additional pressure sensor is required outside the valve, as a result of which the number of components in the system and connecting lines can be reduced, which advantageously reduces the complexity of the system.

Figure 2:
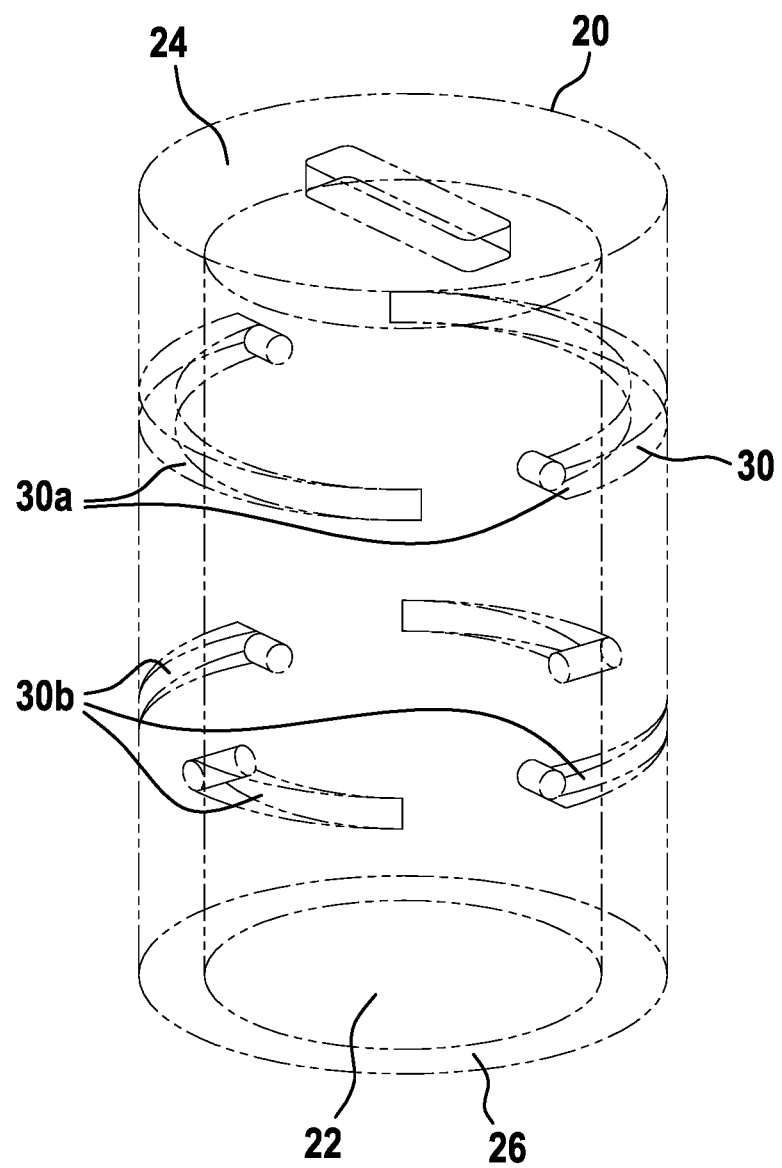
Figure 3:
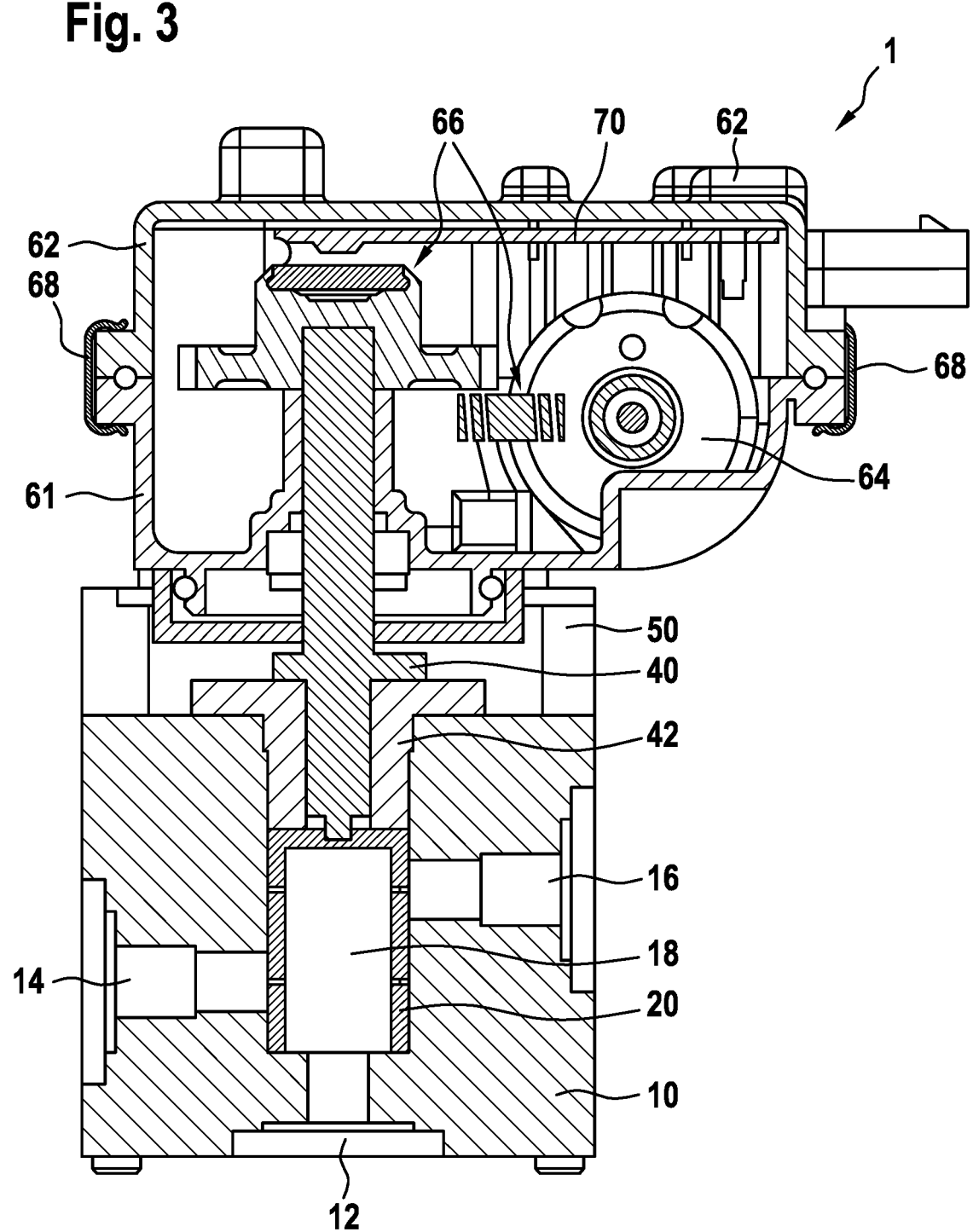
Figure 4:
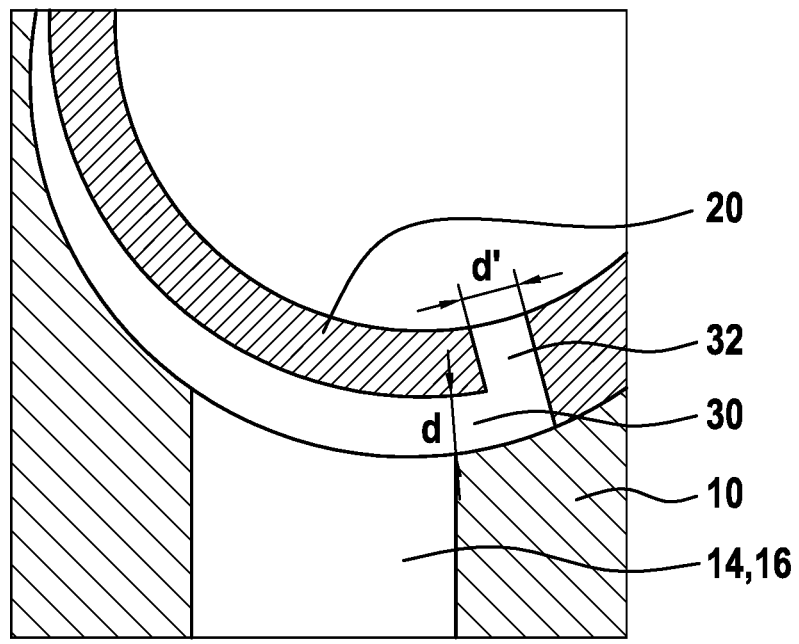
Figure 5C:
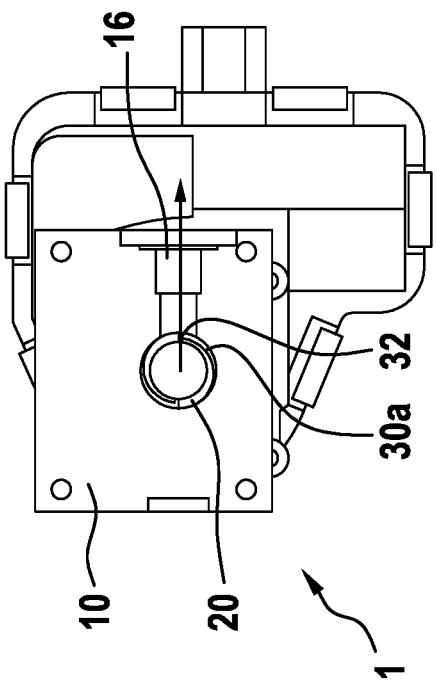
Figure 5D:
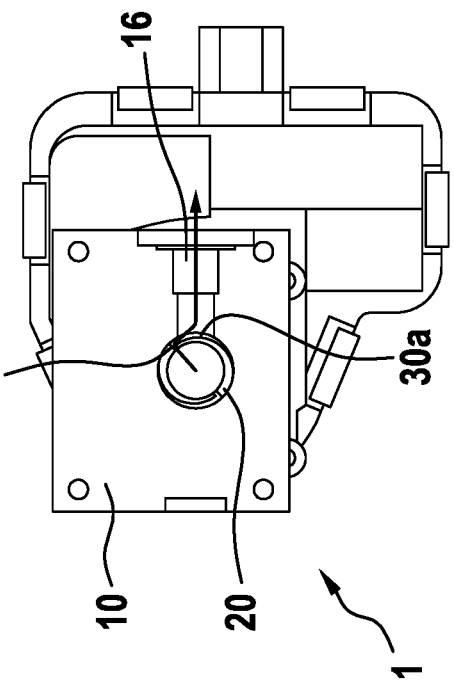
Figure 5A:
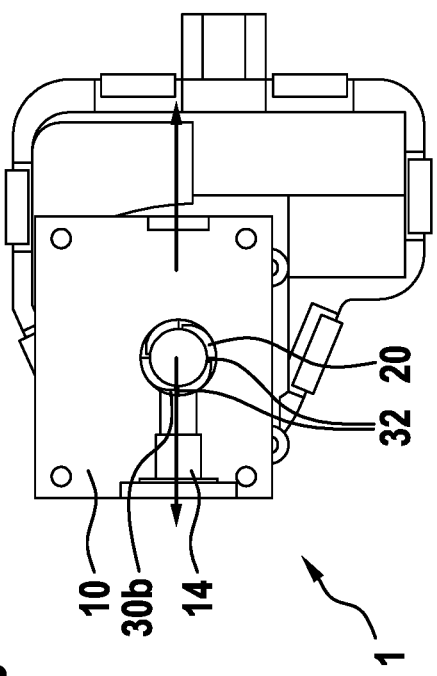
Figure 5B:
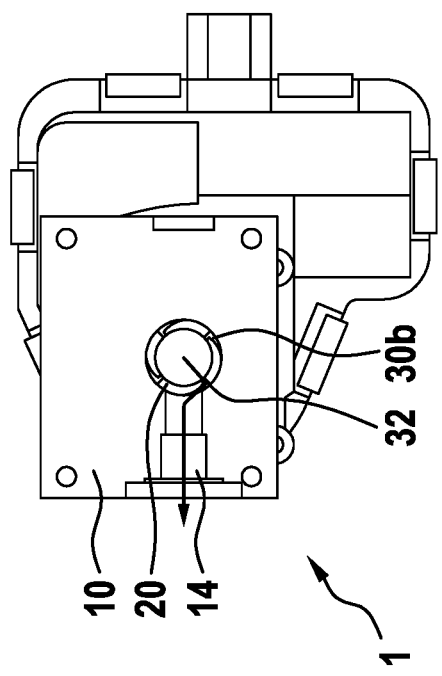
Figure 6:
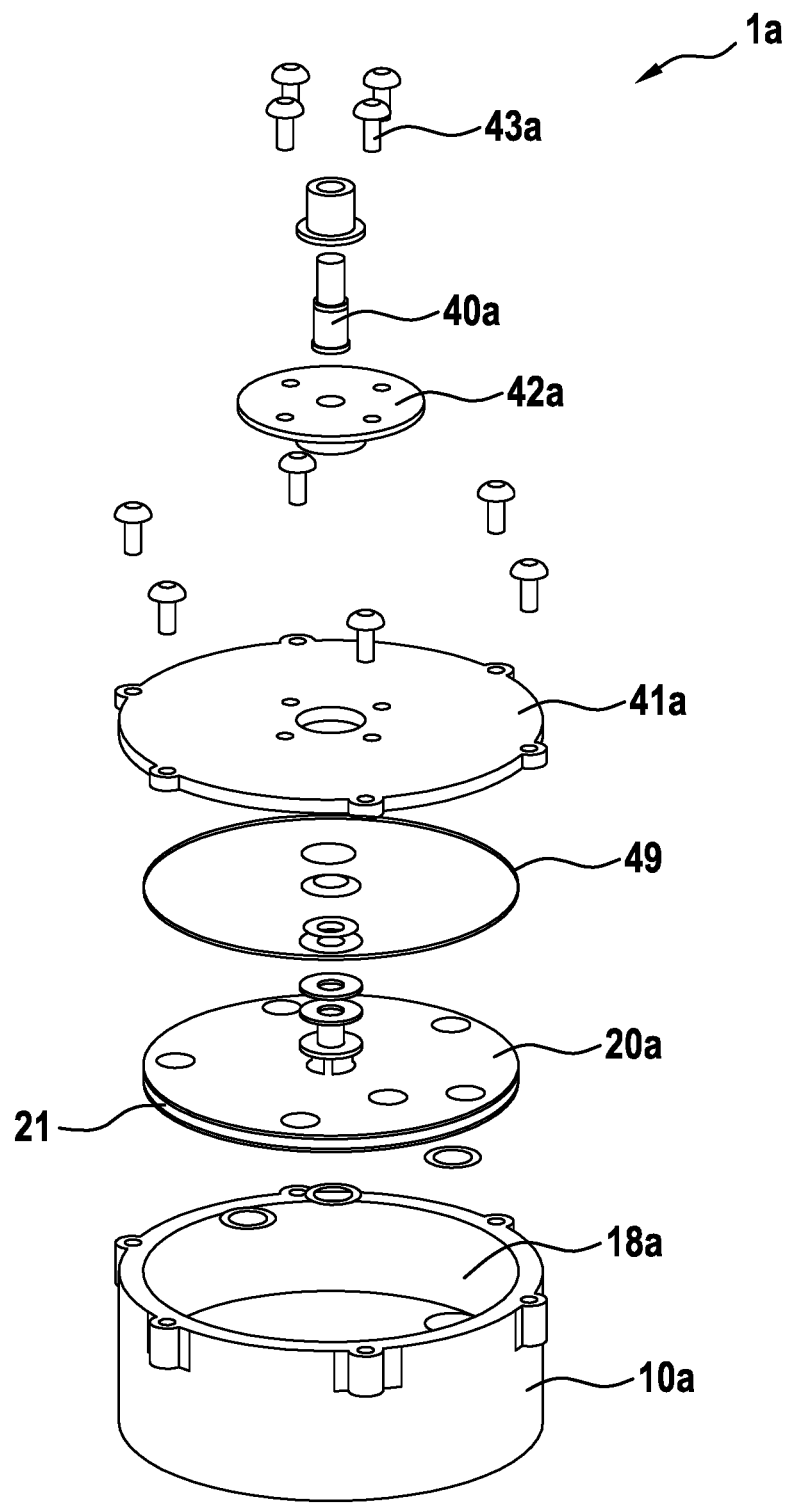
Figure 7:
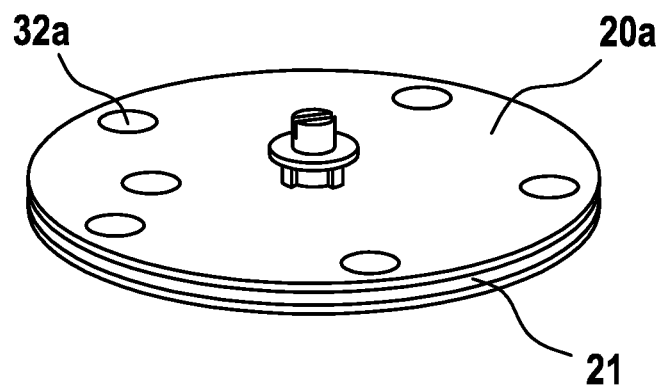
Figure 8:
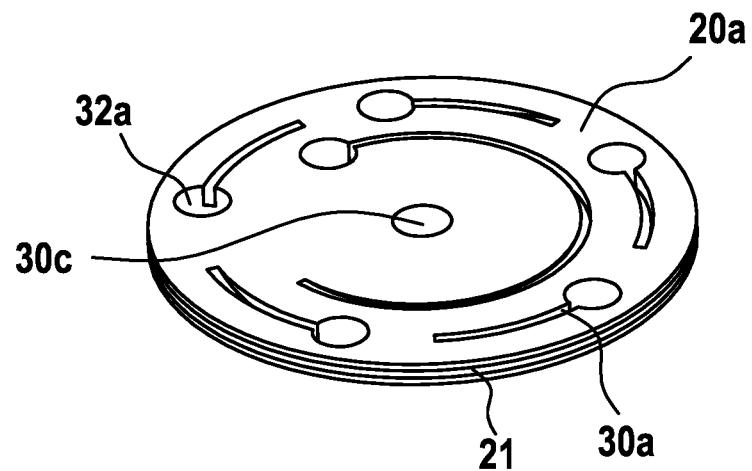
Figure 9:
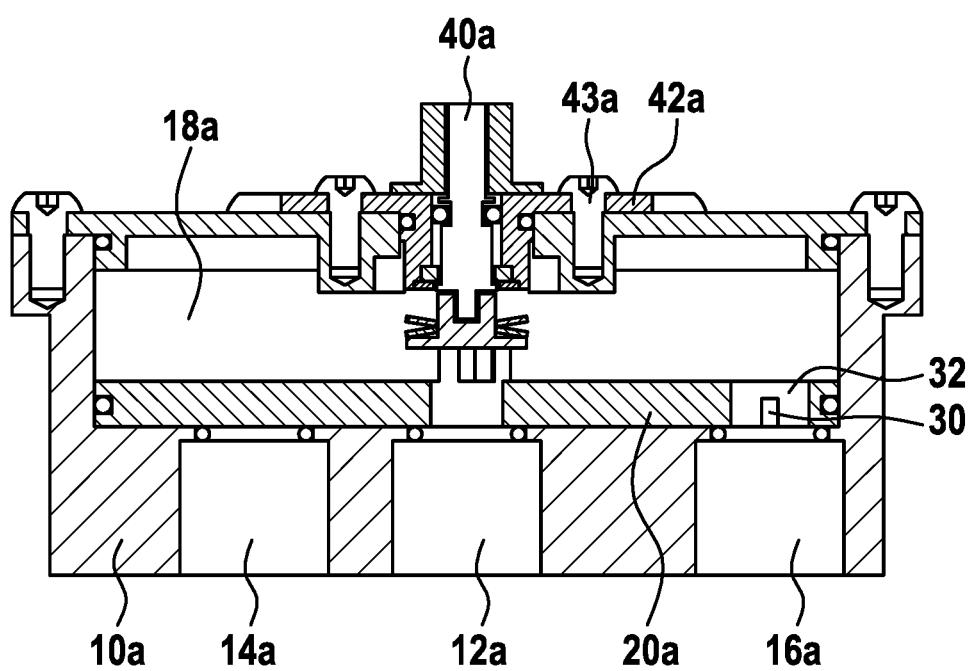
Figure 10:
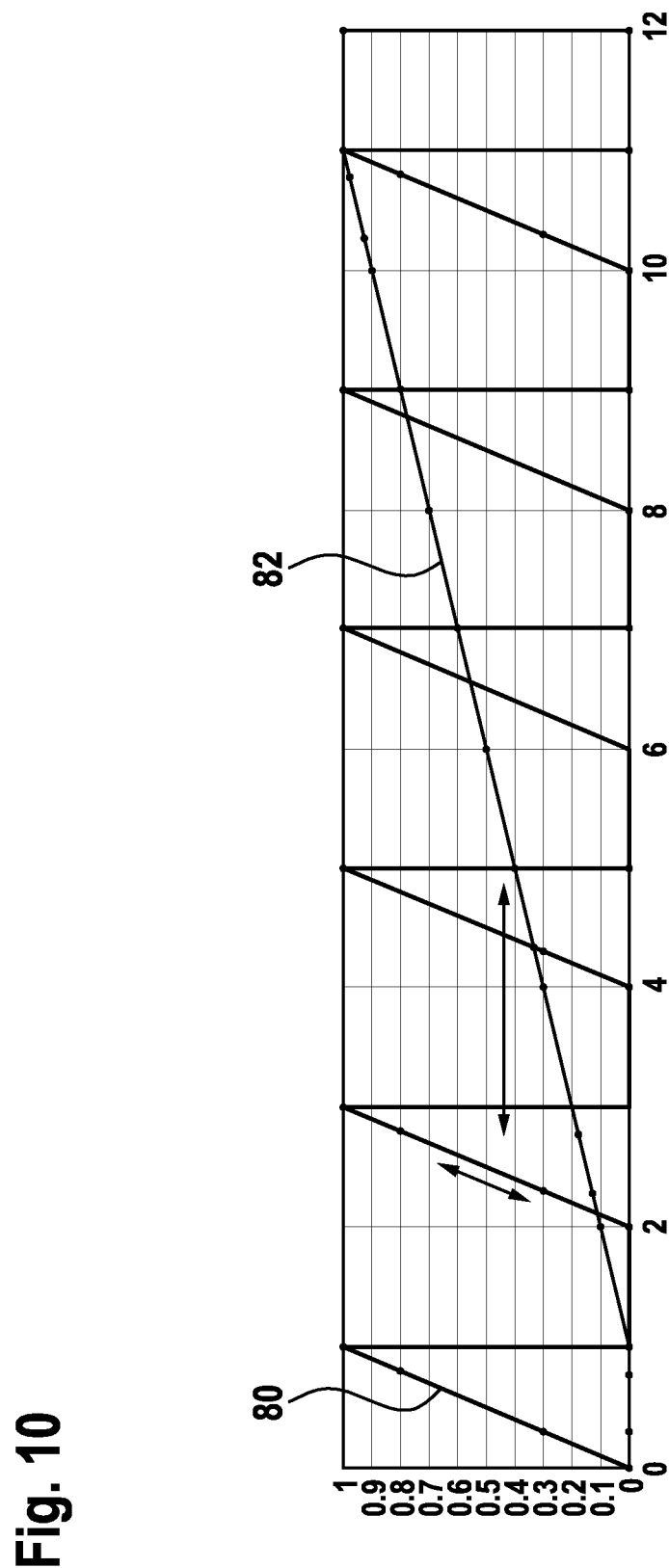

Exemplary embodiments are shown in the figures and are described in greater detail in the following description. In the figures:

FIG. 1 shows a first exemplary embodiment,

FIG. 2 shows one embodiment of a valve means of a valve according to the invention, FIG. 3 shows a sectional view through a valve according to the invention in accordance with the first exemplary embodiment, FIG. 4 shows a sectional view through an opening and recess of a valve means in accordance with the first exemplary embodiment, FIGS. 5a through 5d show a plurality of rotary positions of the valve means with respect to the valve housing, FIG. 6 shows a further exemplary embodiment, FIG. 7 shows a plan view of one embodiment of a valve means, FIG. 8 shows a view from below of the embodiment of a valve means according to FIG. 7, FIG. 9 shows a sectional view through a valve according to the invention in accordance with the second exemplary embodiment, and FIG. 10 shows the ratio of the opening cross section of the second and the third opening with respect to the rotary position of the valve means.

DETAILED DESCRIPTION

FIG. 1 shows a first exemplary embodiment of the valve 1 according to the invention in an exploded illustration. The valve 1 has a valve means housing 10. The valve means housing 10 has at least one first opening 12. The valve means housing 10 preferably has a first opening 12, a second opening 14 and a third opening 16. In particular, the first opening 12 is configured as an input. The second opening 14 and third opening 16 are configured in each case as outputs. The second and the third opening 14, 16 are configured within the valve means housing 10 perpendicularly with respect to the longitudinal axis of the valve 1. The second and third opening 14, 16 are configured, in particular, as radial bores. The valve means housing 10 can be configured, in particular, as a valve means block.

Furthermore, the valve 1 has a valve means 20. The valve means 20 is of movable configuration, rotatably with respect to the valve means housing 10. In particular, the valve means 20 is arranged in part within the valve means housing 10. The valve means housing 10 has a recess 18 for receiving the valve means 20. The recess 18 forms the throughflow region 18. The valve means 20 is configured in such a way that it can be moved in the circumferential direction with respect to the valve means housing 10. The openings 12, 14, 16 open into the throughflow region 18. The throughflow region 18 is open toward a surface of the valve means housing 10.

The valve means 20 has a rotationally symmetrical, in particular cylindrical, basic shape. The valve means 20 is of pot-shaped or sleeve-shaped configuration.

FIG. 2 shows an enlarged view of the valve means 20. The valve means 20 has a shell 22, a bottom 24 and an edge 26. The pot-shaped basic shape of the valve means 20 is open in the direction of the first opening 12. The bottom 24 is configured, in particular, as a circular disk. The bottom can also preferably comprise merely one or more connecting elements, in particular spokes. The valve means 20 is open toward the edge 26. The edge 26 forms an axial end of the valve means 20. The valve means 20 points with its edge 26 in the direction of the first opening 12. The valve means 20 has an inner region. The inner region is surrounded by the shell 22 and the bottom 24. The shell 22 has at least one recess 30.

The recess 30 has a varying depth and/or width. The recess is of continuous configuration in a part region thereof. The continuous region of the recess 30 is, in particular, of circular configuration. The continuous region of the recess 30 is preferably configured as a hole. The recess comprises an aperture.

At least one part of the recess 30 extends in the circumferential direction of the valve means 20.

The recess 30 is configured as a channel, in particular as a groove, preferably as laterally milled slots. The recess 30 runs in the circumferential direction at least partially along the surface, in particular of the shell 22.

The valve means 20 preferably has more than one recess 30. The recesses 30 are arranged offset in the circumferential direction, in particular spaced apart from one another. Furthermore, the recesses 30 are arranged offset, in particular spaced apart, in the longitudinal direction of the valve means 20. According to FIG. 2, the valve means 20 has two groups of recesses 30. The first group of recesses 30a is configured spaced apart in the longitudinal direction from the second group of recesses 30b. The recesses 30 of a group are in turn arranged spaced apart in the circumferential direction from one another.

The recesses 30a interact, in particular, with the third opening 16. The second group of recesses 30b interacts with the second opening 14. The valve means 20 and the recesses 30 make a regulation of the fluid stream through the first, second and third opening 12, 14, 16 possible. Here, the regulation takes place in a manner which is dependent on the rotary position of the valve means 20 with respect to the openings 12, 14, 16. The regulation takes place in a manner which is dependent on the overlap of the second opening 14 and third opening 16 by way of a recess 30, 30a, 30b of the valve means 20. In particular, the regulation takes place in a manner which is dependent on the position of the recesses 30 in the valve means 20 with respect to the openings 12, 14 and 16. The opening cross section of the third opening 16 is regulated via the first group of recesses 30a in the valve means 20. The change of the opening cross section and therefore the regulation of the fluid stream take place in a manner which is dependent on the rotary position of the valve means 20.

The outer wall of the valve means 20 bears tightly against the inner wall of the valve means housing 10. As soon as a part of the outer wall of the valve means 20 without a recess 30 lies over the third opening 16 in the inner wall of the valve means housing 10, the corresponding opening 16 is closed completely. If recesses 30 in the outer wall of the valve means 20 are placed over the third opening 16 in the valve means housing by way of rotation, a desired opening cross section can be released.

The opening cross section of the second opening 14 is controlled via the second group of recesses 30b in the valve means 20. As soon as a part of the outer wall of the valve means 20 without a recess 30b lies over the opening 14 in the inner wall of the valve means housing 10, the second opening 14 is closed completely. If corresponding recesses 30b in the outer wall of the valve means 20 are placed over the opening in the valve means housing 10 for the second opening 14 by way of rotation, a desired opening cross section can be released.

The recesses 30 in the valve means 20 of the first and second group are designed in such a way that the second group has more recesses 30b than the first group 30a. The spacing of the recesses 30a in the first group is likewise multiple times greater than the spacing of the recesses 30b of the second group. In addition, the recesses 30a of the first group are designed in such a way that the profile of the opening cross section from closed as far as open to the maximum is drawn out over the rotational movement to a substantially longer extent than in the first group. The recesses 30a are longer in the circumferential direction than the recesses 30b. The profile of the opening cross section of the first group of recesses 30a extends over a plurality of openings 14 of the second group of recesses 30b. The recesses 30a of the first group form, in particular, elongated channels with a decreasing cross section. The recesses 30b of the second group form, in particular, shorter channels, in comparison with the recesses 30a, with a decreasing cross section.

FIG. 3 shows a sectional view through a valve 1 according to the invention in accordance with the first embodiment. The valve means 20 is arranged in the throughflow region 18 of the valve means housing 10. The first, second and third opening 12, 14, 16 open into the throughflow region 18. The throughflow region 18 is closed, in particular, by way of the flange 42. The flange 42 preferably holds the valve means 20 in the throughflow region 18. The flange 42 prevents a displacement (beyond the normal tolerance range) of the valve means 20 in the axial direction of the valve 1. The flange 42 is connected fixedly to the valve means housing 10 by means of screws 43.

Furthermore, a shaft 40 is provided. The shaft 40 runs at least partially in the flange 42. In particular, the shaft 40 is mounted rotatably via the flange 42. The shaft 40 has a circumferential fold; the fold prevents a displacement of the shaft 40 in the axial direction.

Furthermore, the valve 1 has a holder 50. The holder 50 connects the valve means housing 10 to the actuator housing 60. The actuator housing 60 comprises two housing parts 61 and 62. The two housing parts 61 and 62 are protected by means of a sealing ring 63 with respect to a fluid exchange between the interior space of the actuator housing 60 and its surroundings. An electric drive 64 is arranged within the housing parts 61 and 62. The electric drive 64 is configured, in particular, as a stepping motor, a brushless motor or a brush motor.

Furthermore, the valve 1 has a gear mechanism 66. The gear mechanism 66 diverts the rotational movement of the electric drive 64 to the shaft 40. In particular, a gear mechanism element 66 is connected fixedly to the shaft 40. A further gear mechanism element 66 is connected fixedly to the motor shaft. The gear mechanism 66 is a gearwheel mechanism.

The housing parts 61 and 62 are connected to one another by means of clips 68 which are attached on the outer circumference of the housing parts 61 and 62.

The motor electronics 70 are arranged in the region of the housing part 62 or in the interior space of the housing part 62. The motor electronics 70 serve for the actuation of the electric motor 64. The motor electronics 70 have, in particular, a Hall sensor. The Hall sensor determines the precise position of the shaft 40 or one of the gear mechanism gears of the gear mechanism 66.

FIG. 4 shows an enlarged sectional view through a recess 30. The section runs in accordance with a plane which is configured perpendicularly with respect to the axial direction of the valve 1. A fluid stream can be configured in accordance with the position of the valve means 20 with respect to the opening 14, 16. The fluid stream can take place from the interior space of the valve means 20 via the continuous region 32 of the recess 30 and the channel-shaped, in particular groove-shaped, region of the recess 30. The configuration of a fluid stream in the opposite direction is likewise possible. The cross section d changes as far as d' in a manner which is dependent on the rotary position of the valve means 20 with respect to the opening 14, 16. The quantity of the fluid stream or the fluid which can flow through the recess 30 varies in a manner which is dependent on the size of the cross section.

In accordance with FIG. 4, the cross section of the recess 30 decreases in the case of a rotation counter to the clockwise direction. The decrease of the cross section leads to a reduction of the opening cross section and therefore to a reduction of the fluid stream through the recess 30. The cross section increases in the case of a rotation of the valve means 20 in the clockwise direction. If the continuous region 32 of the recess 30 forms an extension of the opening 14, 16, the fluid can flow with minimum resistance from the opening into the interior space, or else vice versa. The throughflow cross section corresponds to d'.

FIG. 5 shows a sectional view through the valve 1 in the region of the second opening 14. A maximum opening cross section is configured in the position of the valve means 20 according to FIG. 5a. The fluid can flow directly from the opening 14 via the continuous region 32 of the recess 30 into the interior space, and vice versa.

FIG. 5b shows a valve means 20 which is turned in comparison with FIG. 5a. In the case of the valve means 5b, the fluid flows via the channel-shaped part of the recess 30 and the continuous region 32 of the recess 30.

FIG. 5c shows a sectional view through the valve 1 in the region of the third opening 16. Here, FIG. 5c likewise shows the maximum opening cross section. The region 32 of the recess 30 forms a type of extension of the opening 16 into the interior space of the valve means 20.

FIG. 5d shows the valve means 20 turned slightly in comparison with the valve means 20 in FIG. 5c. Here, the fluid flows via the continuous region 32 of the recess 30 and the recess 30 or the channel-shaped part of the recess 30 to the opening 16. The opening cross section d is of smaller configuration in comparison with 5c.

FIG. 6 shows a further exemplary embodiment of a valve 1a according to the invention. The valve 1a has a valve means housing 10a. Openings 12, 14, 16 are configured in the valve means housing 10a. The first opening 12, the second opening 14 and the third opening 16 open in the axial direction into the throughflow region 18a of the valve means housing 10. A valve disk 20a is configured in the throughflow region 18a. The valve disk 20a has a recess 30c in its center.

FIG. 7 shows the plan view of the valve means 20a, and FIG. 8 shows the view from below of the valve means 20a. In its outer circumference, the valve means 20a has a circumferential groove 21. A sealing ring 49 is arranged within the groove. The sealing ring 49 prevents bypassing of the valve means 20a in the edge region of the valve means 20a.

The recess 30c enables a fluid stream starting from the first opening 12 into the throughflow region 18a. In a manner which is dependent on its rotary position, the valve disk 20a closes the second opening 14a and the third opening 16a. The valve disk 20a has recesses 30a. The recesses 30a have a continuous region 32a. The continuous region 32a runs continuously through the valve means 20a or the valve disk 20a. The recess 32a has an aperture. The recesses 30a run in the circumferential direction of the valve disk 20a. The recesses 30a have a homogeneous radius to the center point. The recesses 30a have an increasing depth in or counter to the circumferential direction. The depth is greatest in the region of the continuous recess 32. The recesses 30 have a curve with an (in particular, homogeneous) radius. The recesses 30 are spaced apart from one another in the circumferential direction and/or in the radial direction.

FIG. 9 shows a sectional view through the valve 1a. The flange 42a is screwed on the cover plate 41a by means of screws 43a. The flange 42a has the same functionality as the flange 42. The cover plate 41a closes the throughflow region 18a of the valve means housing 10a. Sealing elements are configured between the cover plate 41a and the valve means housing 10a. Sealing means are configured in the transition between the valve means 20a and the openings 12a, 14a, 16a. The sealing means prevent undesired bypassing of the valve means 20a.

Sealing elements are configured between the openings and the valve means 20a.

Furthermore, a shaft 40a is configured. The shaft 40a produces a fixed connection to the valve means 20a. Here, the shaft 40a has the same function as the shaft 40 in accordance with the first exemplary embodiment.

The valve means 20a is configured as a cylinder-symmetrical element.

The valve in accordance with the second exemplary embodiment can be connected to the actuator housing 60 by means of the holder 50 in accordance with FIG. 1. An actuator in accordance with the first exemplary embodiment can also be used.

FIG. 10 shows by way of example how the opening cross sections of the second opening 14 and the third opening 16 result as a function of the rotary position of the valve means 20 with respect to the valve means housing 10.

The characteristic according to profile 82 results for the third opening 16, whereas the second opening 14 has the characteristic in accordance with the profile 90.

The x-axis corresponds to the rotary position. The y-axis corresponds to the opening cross section. The opening cross section of the second opening 14 can be varied greatly by way of a change of the rotary position of the valve means 20, whereas the opening cross section of the third opening 16 remains approximately constant.

Secondly, the opening cross section of the third opening 16 can be adjusted, whereas the opening cross section of the second opening 14 remains constant when the same point on the adjacent sawtooth is actuated again.

The opening cross section of the second opening 14 plotted against the rotary position of the valve means 20 is of sawtooth-shaped configuration.

As an alternative to the depicted sawtooth characteristic of the second opening 14, another oscillating characteristic by way of the design of the valve means 20 can also be appropriate. The characteristic of the third opening 16 can also have a different shape than the linear one which is shown.

The interruptions between the sawteeth, in which no fluid stream flows, can be selected as desired on the basis of the spacing between the recesses 30. The gradient of the straight lines 80 and 82 is dependent on the length of the recess 30 and, in particular, the profile of the depth of the recess 30.

In relation to the embodiment which is shown, the desired characteristic according to 80 results for the second group of recesses 30b (with a large number of recesses 30b which lie close to one another). Correspondingly, the characteristic according to 82 results for the first group of recesses (with a small number of elongated recesses).

For example, the third opening 16 can be used for controlling the cooling capacity at an evaporator for battery cooling, whereas the second opening 14 is used for controlling the overheating at an evaporator for passenger compartment cooling. This would possibly be advantageous, since the cooling capacity for the battery has to be varied only very rarely on account of the great thermal mass of said battery. This means that a jump between two sawteeth does not have to take place so frequently, as a result of which the influence of the battery cooling control on the passenger compartment cooling can be kept to a minimum.

A profile according to FIG. 10 likewise results for the second exemplary embodiment.

The fluid stream is preferably a refrigerant stream, in particular in a vehicle. The valve preferably serves to regulate and control a refrigerant. Control is also understood to mean regulation.

The elements of the second exemplary embodiment with the designation supplemented by "a" have the functionality of the elements with the same designation of the first exemplary embodiment.

What is claimed is:

1. A valve (1, 1a) for controlling a fluid stream, the valve having a valve means housing, with a first opening (12, 12a) and a second opening (14, 14a), and having a valve means (20, 20a) which has a rotationally symmetrical basic shape and is arranged rotatably within the valve means housing (10, 10a), wherein the valve means (20, 20a) has at least one recess (30, 30a, 30b, 30c), the recess (30, 30a) having a varying dimension, and a part region (32, 32a) of the recess (30, 30a, 30b, 30c) being of continuous configuration through the valve means (20, 20a), and wherein at least one of the at least one recess (30, 30a, 30b, 30c) has a varying depth in a circumferential direction.

2. The valve (1, 1a) as claimed in claim 1, characterized in that the valve means (20, 20a) is of pot-shaped or disk-shaped configuration.

3. The valve (1, 1a) as claimed in claim 2, characterized in that the valve means (20) of pot-shaped configuration has a valve means shell (22), a valve means bottom (24) and a valve means edge (26), the valve means edge (26) pointing in a direction of the first opening (12), the valve means shell (22) having at least one of the at least one recess (30, 30a, 30b), such that a fluid stream through the first opening (12), an inner region of the valve means (20) and the second opening (14) can be regulated in a manner which is dependent on a position of the recess (30, 30a, 30b) of the valve means (20) in relation to the second opening (14).

4. The valve (1, 1a) as claimed in claim 2, characterized in that at least one of the recesses (30c) is configured on an upper side and/or an underside of the disk-shaped valve means (20a).

5. The valve (1, 1a) as claimed in claim 2, characterized in that the valve means (20) of pot-shaped configuration has a valve means shell (22), a valve means bottom (24) and a valve means edge (26), the valve means edge (26) pointing in a direction of the first opening (12), the valve means shell (22) having at least one of the at least one recess (30, 30a, 30b), such that a fluid stream through the first opening (12), an inner region of the valve means (20) and the second opening (14) can be regulated in a manner which is dependent on a rotary position of the recess (30, 30a, 30b) of the valve means (20) in relation to the second opening (14).

6. The valve (1, 1a) as claimed in claim 1, characterized in that at least one of the at least one recess (30, 30a, 30b, 30c) is configured as a channel.

7. The valve (1, 1a) as claimed in claim 1, characterized in that the part region (32, 32a) is configured as a hole.

8. The valve (1, 1a) as claimed in claim 1, characterized in that the valve means housing (10, 10a) has a third opening, such that a fluid stream through the third opening (16) can be regulated in a manner which is dependent on a position of the valve means (20) in relation to the third opening (16).

9. The valve (1, 1a) as claimed in claim 8, characterized in that the second opening (14, 14a) and the third opening (16, 16a) are configured in the valve means housing (10, 10a) offset with respect to one another as viewed in a longitudinal direction and/or a circumferential direction of the valve (1, 1a).

10. The valve (1, 1a) as claimed in claim 8, characterized in that the at least one recess (30, 30a, 30b, 30c) is/are configured in such a way that, plotted against a rotary angle, a first fluid stream from one of the first, second and third openings (12, 12a, 14, 14a, 16, 16a) rises as far as a maximum and is then interrupted, whereas, plotted against the rotary angle, a second fluid stream from an other one of the first, second and third openings (12, 12a, 14, 14a, 16, 16a) rises multiple times, as far as a maximum, and is subsequently interrupted.

11. The valve (1, 1a) as claimed in claim 1, characterized in that the at least one recess includes a second recess (30, 30a, 30b, 30c).

12. The valve (1, 1a) as claimed in claim 1, characterized in that an actuator (64) is provided for rotating the valve means (20, 20a).

13. The valve (1, 1a) as claimed in claim 1, characterized in that the valve means housing (10, 10a) has a throughflow region (18, 18a), the throughflow region (18, 18a) being configured as a recess, and the valve means (20, 20a) being arranged in the throughflow region (18, 18a).

14. The valve (1, 1a) as claimed in claim 1, characterized in that the valve is an expansion valve.

15. The valve (1, 1a) as claimed in claim 1, characterized in that at least one of the at least one recess (30, 30a, 30b, 30c) is configured as a groove on an upper side and/or an underside or in an outer circumference of the valve means (20, 20a).

16. The valve (1, 1a) as claimed in claim 1, characterized in that the part region (32, 32a) is configured as a circular aperture.

17. The valve (1, 1a) as claimed in claim 1, characterized in that the valve means housing (10, 10a) has a third opening, such that a fluid stream through the third opening (16) can be regulated in a manner which is dependent on a rotary position of the valve means (20) in relation to the third opening (16).

18. The valve (1, 1a) as claimed in claim 1, characterized in that the at least one recess includes more than two second recesses (30, 30a, 30b, 30c), the at least one recess and the second recesses being spaced apart from one another in a longitudinal direction and/or in a circumferential direction of the valve (1).

19. The valve (1, 1a) as claimed in claim 1, characterized in that an actuator (64) is provided for rotating the valve means (20, 20a) as a stepping motor, a brush motor or a brushless motor.

20. The valve (1, 1a) as claimed in claim 1, characterized in that the valve means housing (10, 10a) has a throughflow region (18, 18a), the throughflow region (18, 18a) being configured as a recess, and the valve means (20, 20a) being arranged rotatably in the throughflow region (18, 18a).

21. The valve (1, 1a) as claimed in claim 1, characterized in that, plotted against a rotary angle, the second fluid stream is of sawtooth-like configuration, pauses being configured between sawteeth, in which pauses the fluid stream through one of the first, second and third openings (12, 12a, 14, 14a, 16, 16a) is interrupted.

22. A valve (1, 1a) for controlling a fluid stream, the valve having a valve means housing, with a first opening (12, 12a) and a second opening (14, 14a), and having a valve means (20, 20a) which has a rotationally symmetrical basic shape and is arranged rotatably within the valve means housing (10, 10a), wherein the valve means (20, 20a) has at least one recess (30, 30a, 30b, 30c), the recess (30, 30a) having a varying dimension, and a part region (32, 32a) of the recess (30, 30a, 30b, 30c) being of continuous configuration through the valve means (20, 20a), wherein the valve means housing (10, 10a) has a third opening, such that a fluid stream through the third opening (16) can be regulated in a manner which is dependent on a position of the valve means (20) in relation to the third opening (16), and wherein the at least one recess (30, 30a, 30b, 30c) is configured in such a way that, plotted against a rotary angle, a first fluid stream from one of the first, the second, and the third opening (12, 12a, 14, 14a, 16, 16a) rises as far as a maximum and is then interrupted, whereas, plotted against the rotary angle, a second fluid stream from an other one of the first, the second, and the third opening (12, 12a, 14, 14a, 16, 16a) rises multiple times, and is subsequently interrupted.

23. A valve (1, 1a) for controlling a fluid stream, the valve having a valve means housing, with a first opening (12, 12a), a second opening (14, 14a), and a third opening (16, 16a), and having a valve means (20, 20a) which has a rotationally symmetrical basic shape and is arranged rotatably within the valve means housing (10, 10a), wherein the valve means (20, 20a) has at least one recess (30, 30a, 30b, 30c), the recess (30, 30a) having a varying dimension, and a part region (32, 32a) of the recess (30, 30a, 30b, 30c) being of continuous configuration through the valve means (20, 20a), and wherein, plotted against a rotary angle, the fluid stream is of sawtooth-like configuration and is configured with pauses, in which pauses the fluid stream through one of the first, the second and the third opening (12, 12a, 14, 14a, 16, 16a) is interrupted.

* * * * *